(12) United States Patent
Cornell, Jr. et al.

(10) Patent No.: US 11,573,954 B1
(45) Date of Patent: *Feb. 7, 2023

(54) SYSTEMS AND METHODS FOR PROCESSING NATURAL LANGUAGE QUERIES FOR HEALTHCARE DATA

(71) Applicant: Premera Blue Cross, Mountlake Terrace, WA (US)

(72) Inventors: Ronald H. Cornell, Jr., Seattle, WA (US); Kathryn Ann Greve, Sammamish, WA (US); Michael Thomas Semick, Seattle, WA (US)

(73) Assignee: Premera Blue Cross, Mountlake Terrace, WA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/860,841

(22) Filed: Apr. 28, 2020

Related U.S. Application Data

(63) Continuation of application No. 15/807,446, filed on Nov. 8, 2017, now Pat. No. 10,649,985.

(60) Provisional application No. 62/419,396, filed on Nov. 8, 2016.

(51) Int. Cl.
| | | |
|---|---|---|
| *G06F 16/00* | (2019.01) | |
| *G06F 16/24* | (2019.01) | |
| *G06F 16/93* | (2019.01) | |
| *G06Q 10/10* | (2012.01) | |
| *G06F 16/901* | (2019.01) | |
| *G06F 16/245* | (2019.01) | |

(52) U.S. Cl.
CPC ............ *G06F 16/24* (2019.01); *G06F 16/245* (2019.01); *G06F 16/9024* (2019.01); *G06F 16/93* (2019.01); *G06Q 10/1057* (2013.01)

(58) Field of Classification Search
None
See application file for complete search history.

(56) References Cited

U.S. PATENT DOCUMENTS

| | | |
|---|---|---|
| 6,076,088 A | 6/2000 | Paik et al. |
| 6,336,124 B1 | 1/2002 | Alam et al. |
| 6,915,254 B1 | 7/2005 | Heinze et al. |
| 7,356,460 B1 | 4/2008 | Kennedy et al. |
| 8,856,096 B2 | 10/2014 | Marchisio et al. |
| 8,898,798 B2 | 11/2014 | Rogers et al. |

(Continued)

OTHER PUBLICATIONS

Thompson, D., "The Influence of Metatags on Web-Based Search Retrieval, Ranking and Relevancy," master's thesis, Dalhousie University, Halifax, Nova Scotia, Apr. 2002, 45 pages.

*Primary Examiner* — Thu Nguyet T Le
(74) *Attorney, Agent, or Firm* — Christensen O'Connor Johnson Kindness PLLC (57) ABSTRACT

In some embodiments of the present disclosure, techniques are utilized that allow answers to be provided to end users such as health care consumers, based on benefit book documents. The benefit book documents, which do not initially contain machine-readable structural or semantic information, are processed in order to detect structure and create semantic content based on the structure. This semantic content may then be added to a graph that represents the information contained in the benefit book document. A computing device may then use the nodes of this graph to answer questions received from consumers, where templates that provide answers to the questions reference the nodes of the graph.

17 Claims, 8 Drawing Sheets

(56) References Cited

U.S. PATENT DOCUMENTS

| | | | |
|---|---|---|---|
| 2006/0020501 A1* | 1/2006 | Leicht | G06Q 10/1057 |
| | | | 705/322 |
| 2009/0254510 A1 | 10/2009 | Omoigui | |
| 2010/0094766 A1 | 4/2010 | Li et al. | |
| 2011/0167086 A1* | 7/2011 | Sylthe | G06F 16/80 |
| | | | 707/E17.014 |
| 2011/0257997 A1 | 10/2011 | Gale | |
| 2014/0358889 A1* | 12/2014 | Shmiel | G06F 16/35 |
| | | | 707/710 |
| 2016/0071432 A1 | 3/2016 | Kurowski et al. | |
| 2016/0078102 A1 | 3/2016 | Crouch et al. | |
| 2016/0110523 A1 | 4/2016 | Francois | |
| 2016/0232303 A1 | 8/2016 | Amit et al. | |

\* cited by examiner

SYSTEMS AND METHODS FOR PROCESSING NATURAL LANGUAGE QUERIES FOR HEALTHCARE DATA

CROSS-REFERENCE TO RELATED APPLICATION

This application is a continuation of application Ser. No. 15/807,446, filed Nov. 8, 2017, which claims the benefit of Provisional Application No. 62/419,396, filed Nov. 8, 2016, the entire disclosures of which are hereby incorporated by reference herein for all purposes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of enabling one or more computing devices of a healthcare information system to retrieve information from a benefit book document that represents healthcare benefit information in response to a query is provided. A computing device generates a set of structure tags that mark structures within the benefit book document. A computing device determines a set of semantic tags associated with the benefit book document using the set of structure tags and one or more of string matching, format matching, or page placement matching. A computing device builds a graph of information in the benefit book document using the semantic tags. A computing device determines an intent associated with a query for information contained in the benefit book document. A computing device matches the intent to a template, the template including a reference to a value in the graph of information. A computing device transmits a response to the query that includes the value from the benefit book document as indicated by the graph of information.

In some embodiments, a healthcare information system is provided. The healthcare information system comprises one or more computing devices configured to process benefit book documents that represent healthcare benefit information in order to respond to queries. The one or more computing devices are configured to generate a set of structure tags that mark structures within a benefit book document; determine a set of semantic tags associated with the benefit book document using the set of structure tags and one or more of string matching, format matching, or page placement matching; build a graph of information in the benefit book document using the semantic tags; determine an intent associated with a query for information contained in the benefit book document; match the intent to a template, the template including a reference to a value in the graph of information; and transmit a response to the query that includes the value from the benefit book document as indicated by the graph of information.

In some embodiments, a non-transitory computer-readable medium is provided. The computer-readable medium has computer-executable instructions stored thereon that, in response to execution by one or more processors by one or more computing devices of a healthcare information system, cause the healthcare information system to process benefit book documents that represent healthcare benefit information in order to respond to queries, by generating, by a computing device, a set of structure tags that mark structures within a benefit book document; determining, by a computing device, a set of semantic tags associated with the benefit book document using the set of structure tags and one or more of string matching, format matching, or page placement matching; building, by a computing device, a graph of information in the benefit book document using the semantic tags; determining, by a computing device, an intent associated with a query for information contained in the benefit book document; matching, by a computing device, the intent to a template, the template including a reference to a value in the graph of information; and transmitting, by a computing device, a response to the query that includes the value from the benefit book document as indicated by the graph of information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As health insurance becomes more complicated, health care consumers are having a harder time determining answers to questions that they have about their coverage. A given policy is defined in a "benefit book," which is a document that describes coverages, exceptions, terms, and so on. The benefit book exists as a PDF or in another computer-readable format, but is generally stored as flat text with no relevant metadata or other semantic tagging to assist in computer understanding. Traditionally, in order to answer questions that a consumer may have about their coverage, a human operator would have to search through and understand each benefit book as questions are asked by the consumer in order to provide actionable information to the consumer. Because each policy is different, each benefit book is also different. This makes it very difficult and time-consuming for an operator to answer a question about a particular policy.

While it would be beneficial for a computing system to be able to process such queries from consumers, technical hurdles exist. For example, benefit books are not arranged in standard formats, nor do they include computer-readable semantic content. Because of this lack of semantic content, it is not currently possible for a computing device to be able to answer questions from consumers, where the knowledge needed to obtain the answers to the questions is based on the content of the benefit books. What is needed is an automated system that allows benefit books to be ingested by a computing system, such that a computing device can understand the contents well enough to provide answers to specific questions.

In embodiments of the present disclosure, techniques are utilized that allow answers to be provided to end users such as health care consumers, based on benefit book documents. The benefit book documents are processed in order to detect structure and create semantic content based on the structure. This semantic content may then be added to a graph that represents the information contained in the benefit book document. A computing device may then use the nodes of this graph to answer questions received from consumers, where templates that provide answers to the questions reference the nodes of the graph. Without the semantic content, a computing device would be unable to understand the content of the benefit book, and so this providing of a capability that the computing device did not have before is an example of a technical improvement achieved by embodiments of the present disclosure. Further, the organization of the semantic content into a graph, instead of remaining in a flat format in association with the benefit book itself, allows benefit books to be quickly compared to each other, and for answers to be quickly obtained, thus providing lower computing power overhead and faster response as additional examples of technical improvements provided by embodiments of the present disclosure.

Figure 1:
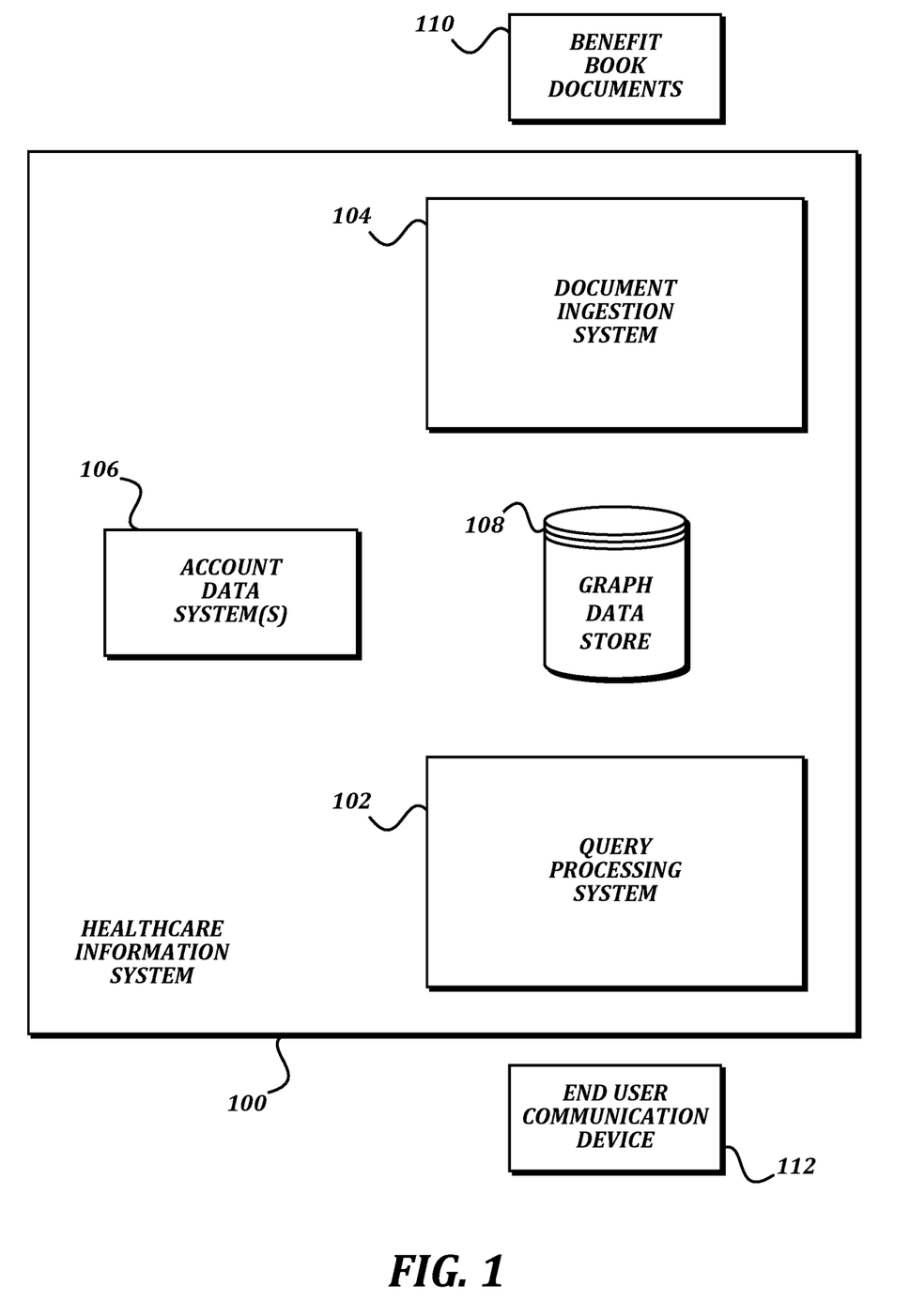
FIG. 1 is a block diagram that illustrates an example embodiment of a healthcare information system according to various aspects of the present disclosure.

FIG. 1 is a block diagram that illustrates an example embodiment of a healthcare information system according to various aspects of the present disclosure. As illustrated, the healthcare information system 100 includes a document ingestion system 104, a graph data store 108, a query processing system 102, and one or more account data systems 106.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer readable medium such as flash memory, random access memory (RAM), hard disk drives, and/or the like. Another example of a data store is a highly reliable, high-speed RDBMS or key-value store executing on one or more computing devices and accessible over a high-speed packet switched network. One of ordinary skill in the art will recognize that separate data stores described herein may be combined into a single data store, and/or a single data store described herein may be separated into multiple data stores, without departing from the scope of the present disclosure.

In some embodiments, the document ingestion system 104 is configured to receive benefit book documents 110 and convert them into graphs to be stored in the graph data store 108. In some embodiments, the document ingestion system 104 may also include additional functionality, including but not limited to the ability to compare graphs in the graph data store 108 to mine for additional semantic content, and the ability to receive feedback on previously generated graphs in order to improve generation of future graphs.

The benefit book documents 110 may be in any suitable format, including but not limited to a Word document, a WordPerfect document, a PostScript document, an XML document, an HTML document, an RTF document, a PDF document, and a plain text document. The benefit book documents 110 may be provided to the document ingestion system 104 using any suitable technique, including but not limited to transmission via a network such as the Internet and submission via a physical medium such as an optical disk, a flash drive, or a magnetic computer-readable medium. Typically, the benefit book documents 110 may include text formatting information, but does not include any semantic tagging information to link portions of the benefit book document 110 to a concept within the healthcare information system 100. One goal of the processing performed by the document ingestion system 104 is to add this semantic tagging information to the otherwise semantically unstructured benefit book document 110.

The query processing system 102 is configured to receive queries from end user communication devices 112, and to generate answers to the queries based at least on the graphs stored in the graph data store 108. The query processing system 102 may also be configured to retrieve information from the account data systems 106 in order to generate answers to the queries. The end user communication devices 112 may be any type of devise through which an end user may transmit a query to the healthcare information system 100. Desktop computing devices, laptop computing devices, tablet computing devices, mobile phones, and land-line phones are all non-limiting examples of end user communication devices 112 that may transmit queries to the healthcare information system 100. The queries may be transmitted via a data connection, a voice-only connection, via an SMS message, or using any other suitable technique.

The account data systems 106 may include one or more information systems of a healthcare provider, and/or may store personal preferences for consumers with regard to interactions with the healthcare information system 100. One non-limiting example of an account data system 106 may manage account data for each consumer, such as a user name, a password, a reference to a benefit book associated with the consumer, an enrollment period date, a selected primary care provider, a preferred communication channel, and the like. Another non-limiting example of an account data system 106 may store payment data for each consumer, including but not limited to amounts paid to various care providers, amounts paid toward a deductible, outstanding claims, and the like.

Each of the components 102, 104, 106, 108 may be provided by one or more computing devices, and may include sub-components as described further below. The one or more computing devices for each of the components 102, 104, 106, 108 may be located in one or more data centers, or may be provided by a cloud computing service. In some embodiments, one or more of the computing devices used to provide the components 102, 104, 106, 108 may be co-located in a single location and may communicate with each other via a local area network. In some embodiments, one or more of the computing devices used to provide the components 102, 104, 106, 108 may be located in separate locations and may communicate with each other via the Internet or another wide area network. The functionality of each of the components 102, 104, 106, 108 is described further below.

Figure 2A:
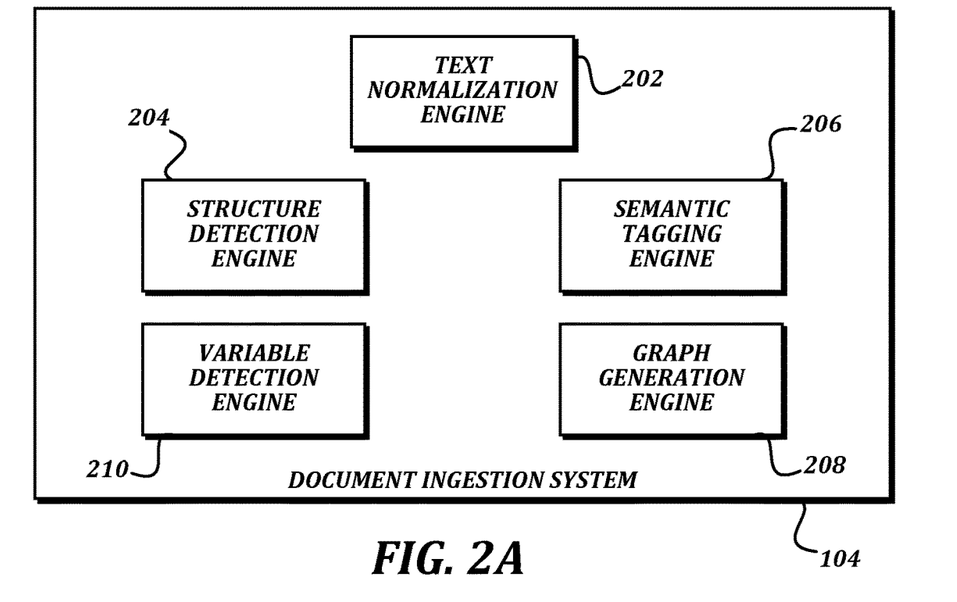
FIG. 2A is a block diagram that illustrates an example embodiment of a document ingestion system according to various aspects of the present disclosure.

FIG. 2A is a block diagram that illustrates an example embodiment of a document ingestion system according to various aspects of the present disclosure. As illustrated, the document ingestion system 104 includes a text normalization engine 202, a structure detection engine 204, a semantic tagging engine 206, a graph generation engine 208, and a variable detection engine 210. In general, the word "engine," as used herein, refers to logic embodied in hardware and/or software instructions, which can be written in a programming language, such as C, C++, C#, COBOL, JAVA™, PHP, Perl, HTML, CSS, JavaScript, VB Script, ASPX, Microsoft .NET™, and/or the like. An engine may be compiled into executable programs or written in interpreted programming languages. Engines may be callable from other engines or from themselves. Generally, the engines described herein refer to logical components that can be merged with other engines, or can be divided into sub engines. The engines can be stored in any type of computer readable medium or computer storage device and be stored on and executed by one or more general purpose computers, thus creating a special purpose computer configured to provide the engine.

In some embodiments, the text normalization engine 202 is configured to perform an initial processing pass on an incoming benefit book document 110 in order to place the benefit book document 110 in a format that can be analyzed by the other components of the document ingestion system 104. For example, the text normalization engine 202 may perform optical character recognition (OCR) on a benefit book document 110 that is provided in PDF format without text data; may remove script, macros, or other computer-executable code from the benefit book document 110; may remove graphics or other extraneous information from the benefit book document 110; or perform other document processing tasks to prepare the benefit book document 110 for further processing.

In some embodiments, the structure detection engine 204 is configured to review the formatting, page location, and other features of text in the normalized document, and to use this information to apply structure tags to the normalized document. For example, the structure detection engine 204 may detect headings, subheadings, body text, and the like, and apply tags to indicate which text of the normalized document is associated with each of these structures.

In some embodiments, the semantic tagging engine 206 is configured to analyze the benefit book documents 110 in view of the structure tags applied by the structure detection engine 204, and to apply semantic tags to the tagged structures. In some embodiments, the graph generation engine 208 is configured to use the semantic tag information to build graphs that represent the benefit book documents 110. In some embodiments, the variable detection engine 210 compares graphs to each other in order to detect variables within the benefit book documents 110, and thereby add additional semantic information to the graphs.

Further description of the functionality of the text normalization engine 202, the structure detection engine 204, the semantic tagging engine 206, the graph generation engine 208, and the variable detection engine 210 is provided below.

Figure 2B:
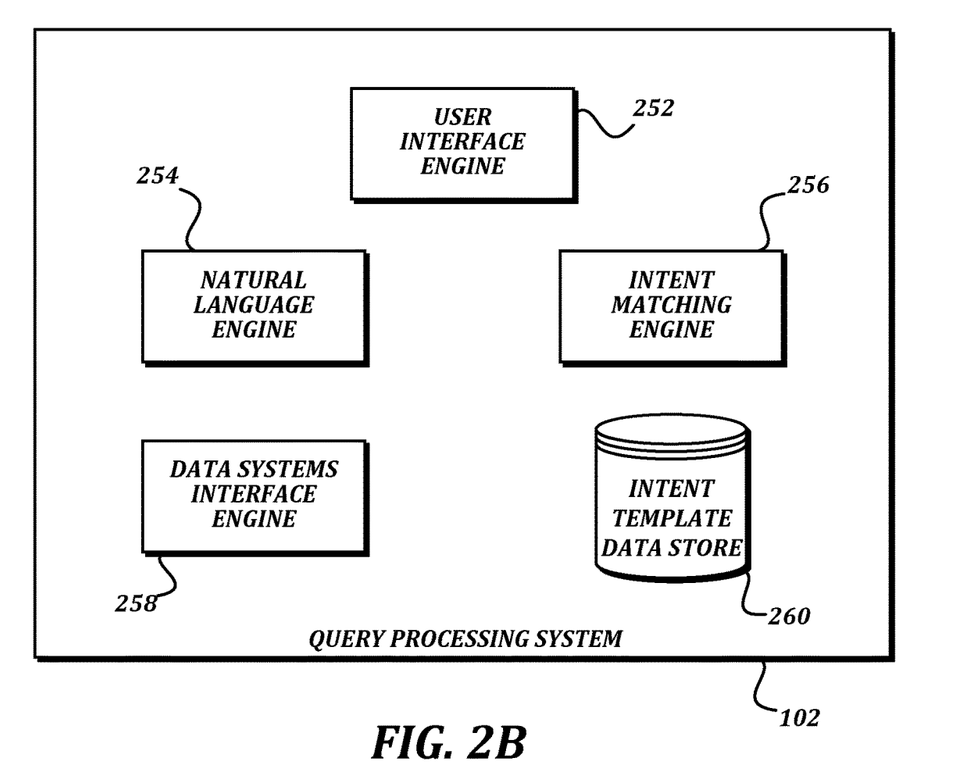
FIG. 2B is a block diagram that illustrates an example embodiment of a query processing system according to various aspects of the present disclosure.

FIG. 2B is a block diagram that illustrates an example embodiment of a query processing system according to various aspects of the present disclosure. As illustrated, the query processing system 102 includes a user interface engine 252, a natural language engine 254, an intent matching engine 256, a data systems interface engine 258, and an intent template data store 260.

In some embodiments, the user interface engine 252 is configured to provide at least one interface that receives queries from end user communication devices 112 and transmits the answers back to the end user communication devices 112. In some embodiments, the interface generated by the user interface engine 252 may be a web based interface or other graphical user interface. Such an interface may accept text-based queries from customers and present answers in text or graphical format. Such an interface may also be interactive, in that it may receive further input from a consumer in order to refine the answer provided. In some embodiments, the interface generated by the user interface engine 252 may be a programmatic interface such that a graphical (or other) interface generated by another system may submit questions and receive answers from the healthcare information system 100 in a programmatic manner Such embodiments may be useful if an external system, including but not limited to a smart speaker system such as Alexa (provided by Amazon.com, Inc.) and Google Home, or a voice-activated assistant such as Cortana (provided by Microsoft Corporation) or Siri (provided by Apple Inc.), conducts voice recognition tasks on the front end in order to generate a text query to be transmitted to the healthcare information system 100. In some embodiments, the interface generated by the user interface engine 252 may be solely voice based, such as an automated phone interface. Such an interface may receive a query via speech input, which the user interface engine 252 may then convert to text using a speech-to-text engine. Such an interface may also provide the answer via a text-to-speech engine.

In some embodiments, the natural language engine 254 is configured to receive plain text queries from the user interface engine 252, and to determine a semantic intent from the plain text. In some embodiments, the intent matching engine 256 is configured to match the semantic intent to a template stored in the intent template data store 260. The template may include answer text, and may also include logic and one or more variables. In some embodiments, the data systems interface engine 258 may be configured to retrieve information from a graph in the graph data store 108 and/or from one or more account data systems 106 in order to provide values for the variables and complete the answer. Further description of the functionality of these components 252, 254, 256, 258, 260 is provided below.

Figure 3:
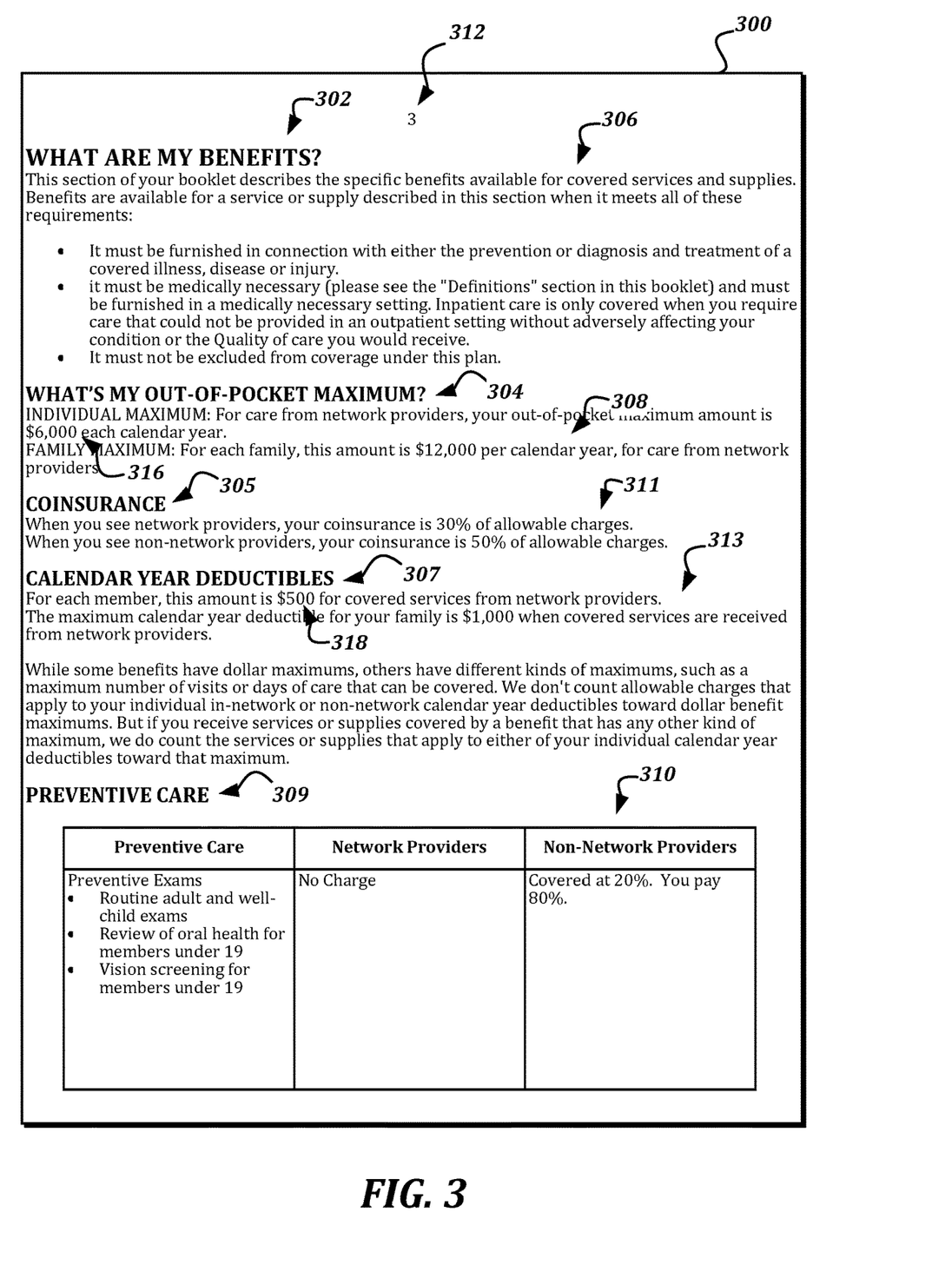
FIG. 3 illustrates an example embodiment of a page of a benefit book document according to various aspects of the present disclosure.

FIG. 3 illustrates an example embodiment of a page of a benefit book document according to various aspects of the present disclosure. The page 300 illustrates multiple features to be processed by the document ingestion system 104. As shown, the page 300 includes a heading 302 ("What Are My Benefits?"), and several subheadings 304, 305, 307, 309 ("What's My Out-Of-Pocket Maximum?" "Coinsurance," "Calendar Year Deductibles," and "Preventive Care," respectively). The page 300 also includes several instances of body text 306, 308, 311, 313; a table 310; a page number 312; and several variables 316, 318 that may be detected. These labels have been added to FIG. 3 for discussion only. When the benefit book document 110 that includes the page 300 is received by the document ingestion system 104, no tagging of this structure is present. Also, not all of the features in the page 300 are labeled, for ease of discussion and for brevity. One of ordinary skill in the art will recognize that additional structures may be tagged in the page 300. Further discussion of how such structure may be detected by the document ingestion system 104 is provided below.

Figure 4:
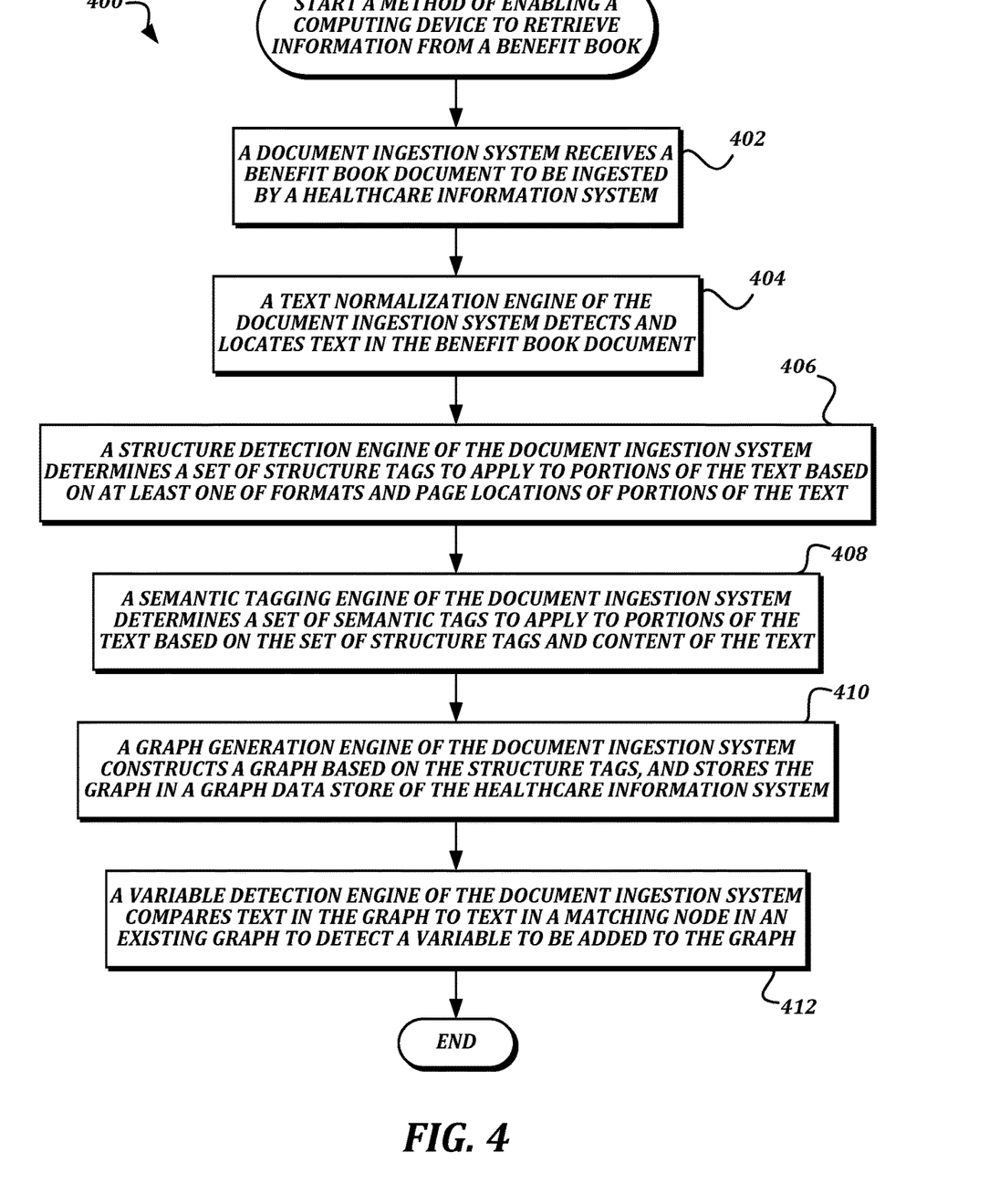
FIG. 4 is a flowchart that illustrates an example embodiment of a method of enabling a computing device to retrieve information from a benefit book according to various aspects of the present disclosure.

FIG. 4 is a flowchart that illustrates an example embodiment of a method of enabling a computing device to retrieve information from a benefit book according to various aspects of the present disclosure. From a start block, the method 400 proceeds to block 402, where a document ingestion system 104 receives a benefit book document 110 to be ingested by a healthcare information system 100. As discussed above, this may happen via any suitable communication technique, including but not limited to a network transmission or exchange of a non-transitory computer-readable medium. Further, the benefit book document 110 may be in any document format, including but not limited to the formats described above.

At block 404, a text normalization engine 202 of the document ingestion system 104 detects and locates text in the benefit book document 110. If the benefit book document 110 arrived in an image format (such as a PDF that includes page images but not text information), the text normalization engine 202 may use OCR in order to create information that represents the text of the image format. The text normalization engine 202 may also generate information that represents the position of blocks of text on each page. The text normalization engine 202 may also determine information about fonts used based on the text appearance in the benefit book document 110 (e.g., determining faces for the fonts, determining a point size for the fonts, determining whether a font is bold, underlined, italicized, or otherwise emphasized), and may add such information to the normalized text information. In some embodiments, the benefit book document 110 may already have one or more of text information, text position information, and font information embedded therein, in which case the text normalization engine 202 may simply extract this information from the benefit book document 110 and place it in a normalized format to be consumed by other portions of the document ingestion system 104.

Next, at block 406, a structure detection engine 204 of the document ingestion system 104 determines a set of structure tags to apply to portions of the text based on at least one of formats and page locations of portions of the text. In some embodiments, the structure detection engine 204 may detect headings, sub-headings, and body text within the text based on factors including, but not limited to, a font size, a font weight, a font emphasis, and a page location. In some embodiments, the detection performed by the structure detection engine 204 may be based on absolute values of these factors, while in some embodiments, the detection may be based on relative values of these factors.

As an example of the absolute value embodiment, the structure detection engine 204 may tag portions of text larger than 14 point as headings, portions of text between 14 point and 12 point as sub-headings, and portions of text that are 12 point or smaller as body text. As an example of the relative value embodiment, the structure detection engine 204 may tag the largest text as a heading regardless of absolute size, may tag the next largest text as a sub-heading, and may tag all smaller text as body text. In some embodiments, the structure detection engine 204 may use an indent level in order to detect headings, sub-headings, and body text, regardless of (or in addition to) font size, font weight, and/or font emphasis.

In some embodiments, the structure detection engine 204 may also detect tables, either by detecting the lines of the table, or by finding a table-like layout of multiple blocks of text. The structure tags added for the table may indicate the table as a whole, and may also indicate individual rows, cells, columns, and/or headers of the table.

In some embodiments, the structure detection engine 204 may be configured with a set of rules to tag specific structures based on a known page location. For example, the structure detection engine 204 may be configured with a rule to tag isolated text at the top or bottom of a page with a structure tag indicating a header, a footer, a page number, a title, and/or the like.

Returning to FIG. 3, it can be shown how each structure tag may have been applied by the structure detection engine 204. For example, the structure detection engine 204 may have found that the "What Are My Benefits?" text 302 was the largest text, and therefore tagged it as a heading. The structure detection engine 204 may have found that the "What's My Out-Of-Pocket Maximum?" 304, "Coinsurance" 305, "Calendar Year Deductibles" 307, and "Preventive Care" 309 texts were smaller than the "What Are My Benefits?" text 302 but larger than other text, and therefore tagged them as sub-headings. Likewise, the remainder of the text 306, 308, 311, 313 was the smallest text, and was therefore tagged as body text. The table 310 may have been detected and tagged by virtue of the lines, or by virtue of the tabular arrangement of the text blocks therein. The page number 312 may have been identified and tagged by virtue of its location at the top center of the page 300.

Returning again to FIG. 4, the method 400 proceeds to block 408, where a semantic tagging engine 206 of the document ingestion system 104 determines a set of semantic tags to apply to portions of the text based on the set of structure tags and content of the text. The semantic tags identify specific meaning in the document in such a way that the content can be understood to represent specific healthcare information. For example, a semantic tag may indicate a deductible, a particular covered procedure, an out-of-pocket maximum, and/or any other type of healthcare information. The particular semantic tags to be used may be predetermined within the semantic tagging engine 206, though particular values or portions of text tagged by the semantic tags may change with each benefit book document 104. This allows the system 100 to be flexible and provide consistent answers, even if the format of a benefit book document 110 changes between versions or across coverage groups or accounts. In some embodiments, the semantic tagging engine 206 finds semantic tags that match tagged structure within the benefit book document 110 using one or more of string matching (e.g., apply a deductible semantic tag to a portion of structured text that includes the text "deductible"), format matching (e.g., apply a deductible semantic tag to a portion of structured text that includes a sub-header of "deductible"), or page placement matching (e.g., apply a group identifier semantic tag to a string of numbers located in a specified location on a first page of the benefit book document 110). In some embodiments, an operator may review the results of semantic tagging, and provide feedback to a machine learning process such that future semantic tagging may be improved.

Next, at block 410, a graph generation engine 208 of the document ingestion system 104 constructs a graph based on the structure tags, and stores the graph in a graph data store 108 of the healthcare information system 100. In some embodiments, the graph may use the semantic tags as nodes, and may connect them with edges according to a predetermined hierarchy. In some embodiments, placing a node for a given semantic tag in the graph as a node may cause other related structure tags or semantic tags to be placed in the graph as related nodes as well. For example, adding a first node for a semantic tag related to a sub-heading structure may cause a body text that follows the sub-heading structure to be added to a node that is connected to the first node.

Figure 5:
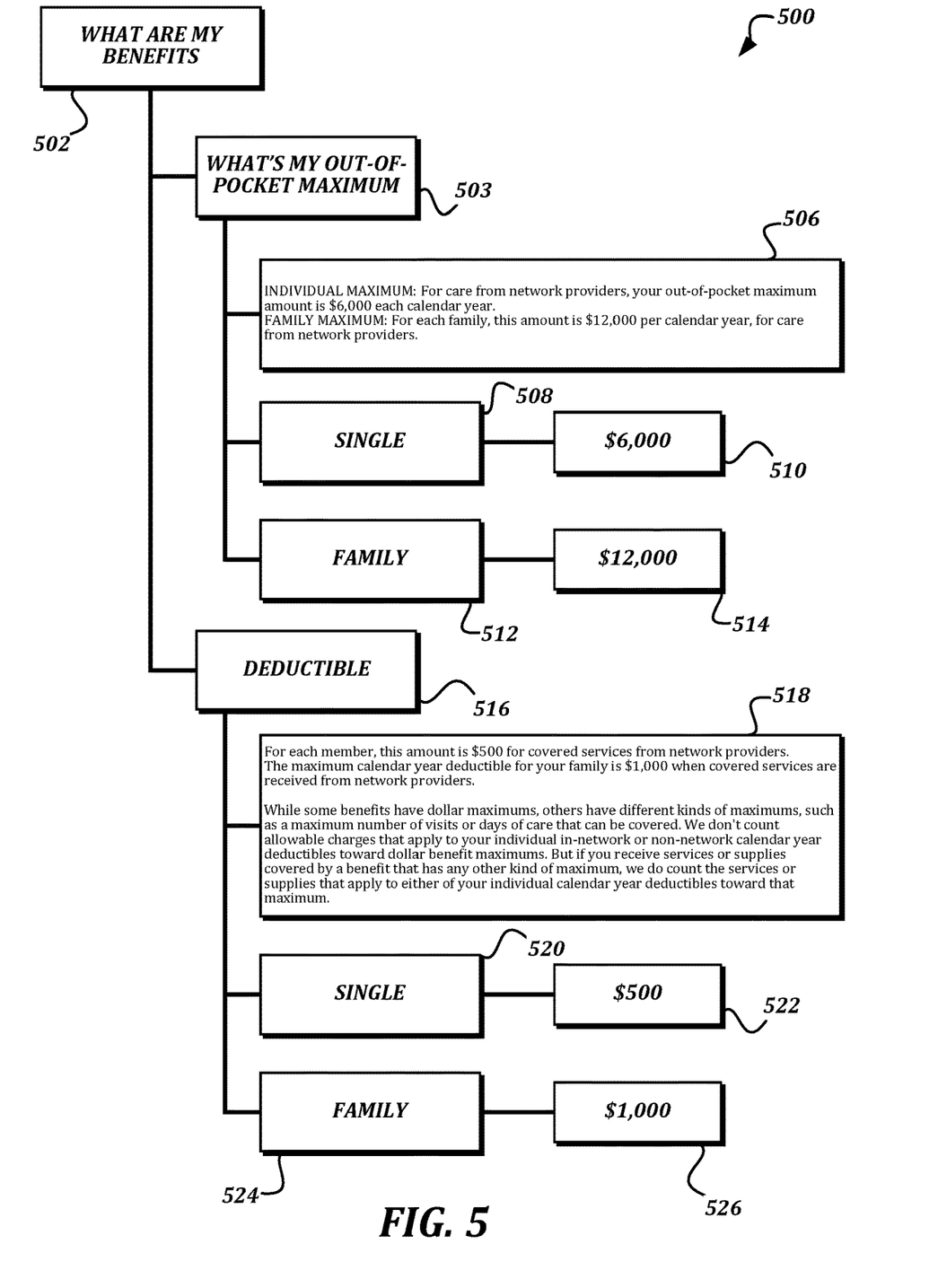
FIG. 5 illustrates an example embodiment of a portion of a graph generated by the graph generation engine according to various aspects of the present disclosure.

FIG. 5 illustrates an example embodiment of a portion of a graph generated by the graph generation engine according to various aspects of the present disclosure. As shown, a first node 502 was created based on the heading structure 302, and a second node 503 and a third node 516 were created based on sub-heading structures 304, 307 that follow the heading structure 302. For the second node 503, the body text 308 that followed the sub-heading structure 304 was added to a fourth node 506, and for the third node 516, the body text 313 that followed the sub-heading structure 307 was added to a fifth node 518. Though not illustrated, each of the nodes may include an identifier of the semantic tag associated with the node. As discussed above, using such a graph instead of the unprocessed structure tags or semantic tags provides technical benefits, at least because the graph storage format allows for more efficient storage of the information, faster search within graphs, and faster comparisons of graphs (or matching portions thereof) to each other. Each of these benefits helps provide the additional technical achievement of being able to provide answers to queries in an interactive system by improving the speed in which answers may be provided.

In some embodiments, the method 400 may proceed to further enhance the graph by pulling out additional data from the text to be stored in a structured format. Accordingly, returning to FIG. 4, the method 400 proceeds to block 412, where a variable detection engine 210 of the document ingestion system 104 compares text in the graph to text in a matching node in an existing graph to detect a variable to be added to the graph. For example, in order to detect variables in the deductible section, the variable detection engine 210 may extract the node 518 that includes the body text under the deductible node 516. The variable detection engine 210 may then compare the text within the node 518 to matching nodes (e.g., a node tagged with a matching semantic tag) in one or more other graphs stored in the graph data store 108. If a small number of words or numbers (e.g., five or less, or a relatively small percentage of words) in the text do not match while the rest of the words do match, the non-matching words are identified as a variable. Once the variable is found, the variable detection engine 210 may create additional nodes within the graph to represent the variables. For example, as shown in FIG. 5, the variable detection engine 210 has added a node 520 to represent a first variable found in the body text 518, along with a node 522 to represent the value of the first variable. The variable detection engine 210 also added a node 524 to represent a second variable found in the body text 518, along with a node 526 to represent the value of the first variable. Similar variable nodes 508, 512 and value nodes 510, 514 were added for the other illustrated body text node 506.

This automatic detection of variables provides numerous benefits, including but not limited to the fact that not every variable present in every benefit book document 110 needs to be predetermined so that string matching, format matching, or other techniques can be used to apply semantic tags to add them to the graph. This allows the document ingestion system 104 to react intelligently to changes in terminology or format without requiring reprogramming of the structure detection engine 204 or the semantic tagging engine 206. It also allows the document ingestion system 104 to detect all variables within a benefit book document 110, and not just those that were known to be present by a system operator. In some embodiments, the variable detection engine 210 may be able to feed its results back to the semantic tagging engine 206 to create new semantic matching rules, such that similar variables in future benefit book documents 110 can be identified by the semantic tagging engine 206. In some embodiments, upon detecting a variable, the variable detection engine 210 may add nodes for the variable both to the graph currently being created as well as the graph to which it was compared in the graph data store 108.

Once the new graph is stored in the graph data store 108 and updated by the variable detection engine 210, the method 400 proceeds to an end block and terminates.

Figure 6:
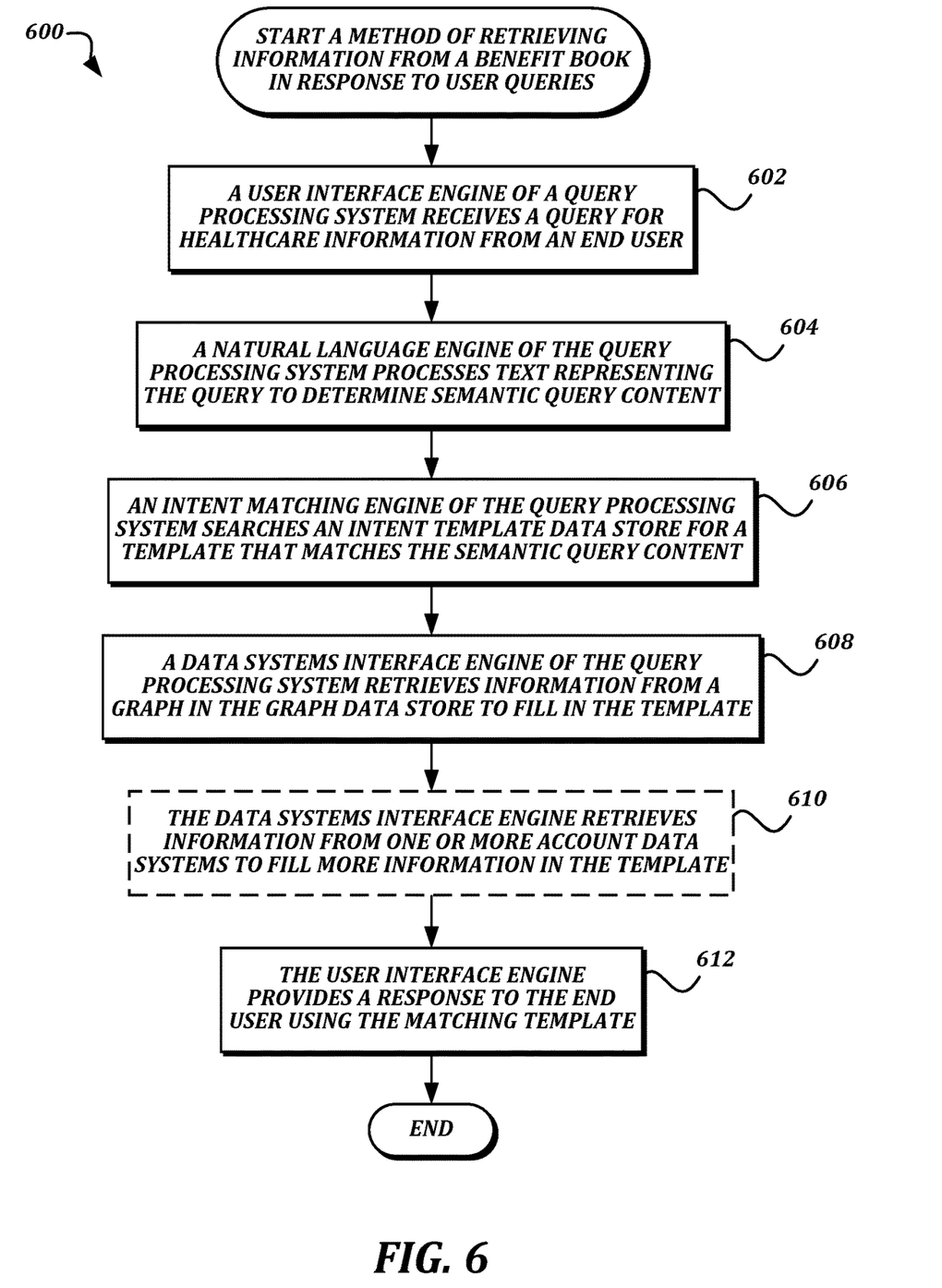
FIG. 6 is a flowchart that illustrates an example embodiment of a method of retrieving information from a benefit book in response to user queries according to various aspects of the present disclosure.

FIG. 6 is a flowchart that illustrates an example embodiment of a method of retrieving information from a benefit book in response to user queries according to various aspects of the present disclosure. From a start block, the method 600 proceeds to block 602, where a user interface engine 252 of a query processing system 102 receives a query for healthcare information from an end user. As discussed above, the query may be transmitted via an end user communication device 112 using any one of a variety of techniques, including but not limited to a voice processing system that uses speech recognition to determine the text of the query, and transmission of a text query via a web interface or an app.

At block 604, a natural language engine 254 of the query processing system 102 processes text representing the query to determine semantic query content. In some embodiments, the processing performed by the natural language engine 254 may use techniques including, but not limited to, detecting parts of speech, detecting proper nouns, detecting numbers and punctuation, and detecting specific nouns from a predetermined corpus. The processing may then be used to generate a normalized version of the query, which can be considered an "intent," or a representation of the semantic content of the end user query with regard to the information they are attempting to retrieve.

At block 606, an intent matching engine 256 of the query processing system 102 searches an intent template data store 260 for a template that matches the semantic query content. The intent matching engine 256 may find the matching template using any suitable technique for information retrieval, including but not limited to finding a stored template that includes one or more nouns that match the semantic query content nouns and finding a stored template with a similar semantic structure to the semantic query content. In some embodiments, the intent matching engine 256 may return two or more templates in response to the search along with relevance scores, such that the user interface engine 252 will present the two or more templates to the end user for selection of a matching template.

The method 600 then proceeds to block 608, where a data systems interface engine 258 of the query processing system 102 retrieves information from a graph in the graph data store 108 to fill in the template. The template may include one or more variables which refer to values within the graph to be filled in to the answer template to create the answer. For example, a given variable may refer to a specific semantic tag identifier or branching path in the graph. The data systems interface engine 258 may use login information for the end user to determine an appropriate graph to retrieve from the graph data store 108, and may then use the semantic tag identifier or branching path to retrieve the associated value from the appropriate graph.

The method 600 then proceeds to optional block 610, where the data systems interface engine 258 retrieves information from one or more account data systems 106 to fill more information in the template. Similar to the graph variables described above, the template may also include variables that reference values stored in one or more account data systems 106. As some non-limiting examples, a given variable may refer to cost information for a selected provider stored in a provider data store, or a piece of account information stored in an account data store. While this block 610 is optional, its inclusion does illustrate an additional technical benefit to embodiments of the present disclosure, in that a simple template may be used to combine data from multiple disparate data sources, which was not possible for computing devices to do in an automated manner as efficiently as described herein for healthcare-related information.

Figure 7A:
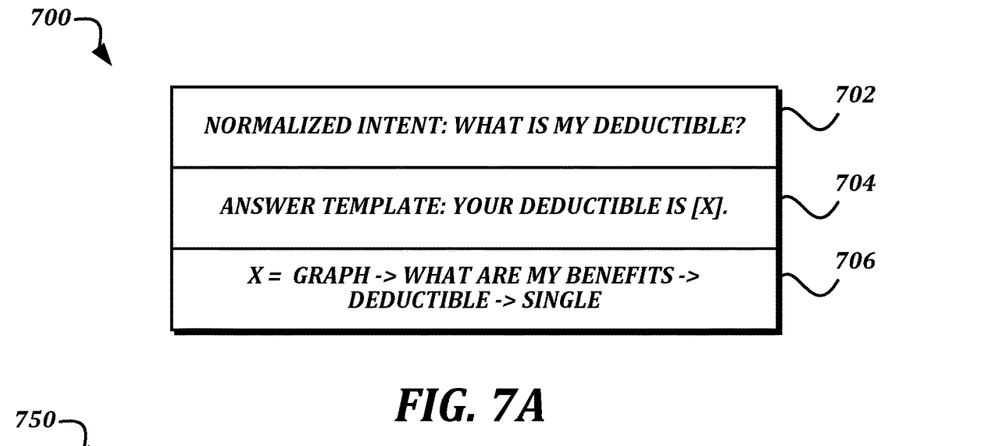
FIGS. 7A and 7B are schematic diagrams that illustrate example embodiments of templates according to various aspects of the present disclosure.
Figure 7B:
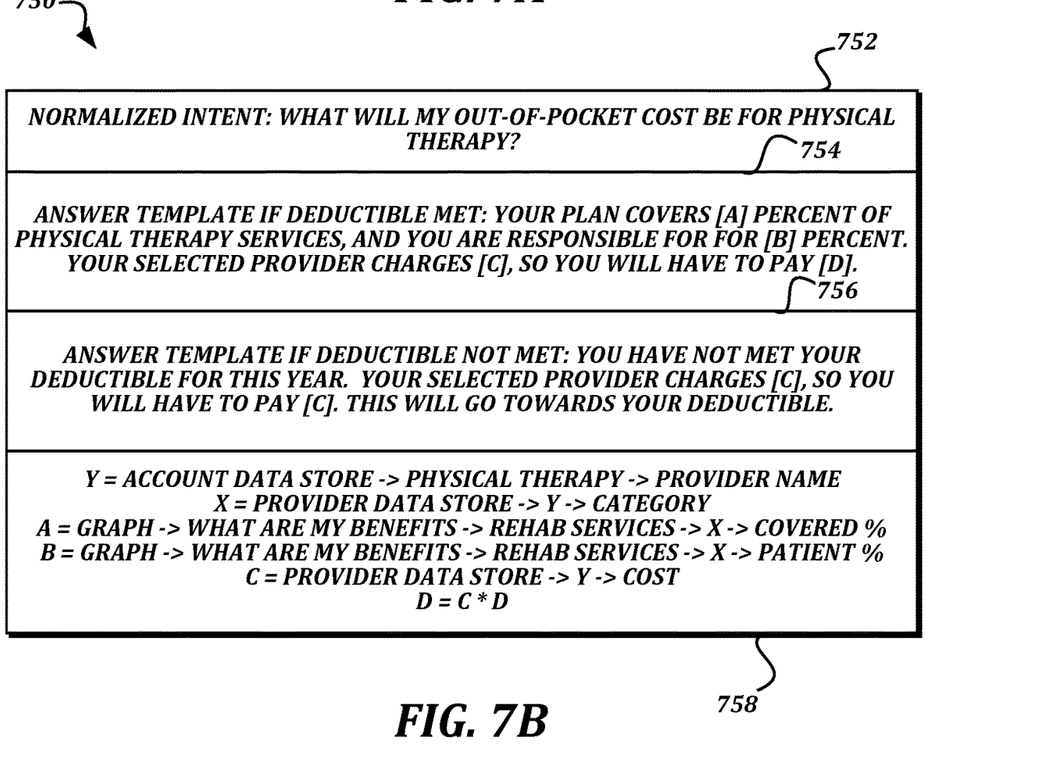

FIGS. 7A and 7B are schematic diagrams that illustrate example embodiments of templates according to various aspects of the present disclosure in order to further illustrate the functionality performed in blocks 608 and 610. FIG. 7A illustrates a simple template 700 for answering a question about an amount of a consumer's deductible. The template 700 includes a normalized intent 702, an answer template 704, and a variable definition 706. The normalized intent 702 can be used to retrieve the template 700 in response to receiving a query that includes a matching intent. The answer template 704 includes the text that will be provided by the user interface engine 252 when presenting the answer to the consumer. As shown, the answer template 704 includes a variable "[X]," which is defined in the variable definition 706. The variable definition 706 defines the variable "X" as referring to the value associated with the graph in the What Are My Benefits→Deductible→Single node, or node 522 in FIG. 3. This value would then be plugged into the answer template 704 to create a query response such as "Your deductible is $2,500." One of ordinary skill in the art will recognize that the variable definition of "What Are My Benefits→Deductible→Single" is an example only, and in some embodiments of the present disclosure, other techniques may be used to link a variable to a particular portion of the graph. For example, in some embodiments, a semantic value identifier associated with a node of the graph may be used to define a variable in the variable definition 706.

FIG. 7B illustrates a more complicated template 750 according to various aspects of the present disclosure. The template 750 includes another normalized intent 752. This normalized intent 752 is not necessarily more complicated in structure than the normalized intent 702 of FIG. 7A, but the answer to the question represented by the normalized intent 752 relies on more factors. Accordingly, the template 750 may include a definition of one or more logical rules that determine a format of the answer to be provided. Though not illustrated, the template 750 may include a definition of logic for a determination regarding whether the end user's deductible has been met. This logic may include a reference to the graph to determine the deductible amount, and may also include a reference to a value in a payment system in order to determine an amount of previous payments submitted. Once these values are retrieved and a determination is made by comparing the value from the graph and the value from the payment system to satisfy the logic, the first answer template 754 or the second answer template 756 is selected according to the determination.

The answer templates 754, 756 includes four variables, [A], [B], [C], and [D], each of which are defined in the variable definition 758. The variable definition 758 is more complex than the variable definition 706 in FIG. 7A, at least because multiple data sources are being referenced, and some variables are being used to define other variables. As shown, the variable definition 706 defines a variable [Y] that pulls the name of a selected provider for physical therapy services from an account data store. This provider may have been previously selected by the end user. The variable definition 706 uses the value for [Y] to retrieve a category (e.g. Network, Non-Network) for the selected provider from a provider data store, and stores it in variable [X]. The variable definition 706 also uses the value for [Y] to retrieve a cost for the selected provider from the provider data store, and stores it in variable [C].

The variable definition 706 uses the category in variable [X] to retrieve a value from the graph for what the covered percentage is for a provider in the category for rehab services, and to retrieve a value from the graph for the patient responsibility percentage for a provider in the category for rehab services. While not illustrated in the graph 500 or the page 300, such information may be listed in the benefit book document similar to the preventive care table 310 in the page 300, and stored in the graph in an appropriate format. Once the cost and the percentages are obtained, the variable definition 706 defines a variable [D] as the cost (variable [C]) times the patient percentage (variable [B]).

These variables may then be used within the selected answer template 754, 756 to generate an appropriate answer. For example, if the end user's deductible has been met, then the coverage percentages would be relevant, and so the first answer template 754 is selected by the logic. The first answer template 754 uses variables [A], [B], [C], and [D] to provide answer text explaining how much the end user will have to pay for the service after the health care provider covers its portion. Such an answer may be, "Your plan covers 80% of physical therapy services, and you are responsible for 20%. Your selected provider charges $100, so you will have to pay 20." If the end user's deductible has not been met, then the coverage percentages would not be relevant, and the second answer template 756 is selected by the logic. The second answer template 756 uses variable [C] to provide the answer text. Such an answer may be, "You have not met your deductible for this year. Your selected provider charges $100, so you will have to pay $100. This will go towards your deductible."

Naturally, the illustrated templates 700, 750 are non-limiting examples only, and in some embodiments, more complex templates may be provided. For example, in some embodiments, additional logic may be used to provide more information for the end user, including but not limited to additional logic and variables to provide information regarding whether or not an out-of-pocket maximum has been reached; whether a co-pay is required; more information about previous amounts paid toward a deductible; and maximum numbers of office visits for particular providers. In addition, other types of information other than those explicitly described above may be used. As a non-limiting example, in some embodiments a geolocation of the end user communication device 112 may be determined, and answers may be tailored based on that geolocation (e.g., different answer text may be provided for out-of-state versus in-state providers).

Returning to FIG. 6, the method 600 proceeds to block 612, where the user interface engine 252 provides a response to the end user using the matching template. The response may be provided in a format that matches the format in which the query was received. As a non-limiting example, if the query was received through a web page interface, then the answer may also be provided through the web page interface. As another non-limiting example, if the query was received through a voice interface over a telephone, then the answer may be provided via a text-to-speech engine over the telephone. As still another non-limiting example, if the query was received through a smart speaker, then the answer may be provided to the smart speaker for playback to the end user.

Once the answer is presented, the method 600 proceeds to an end block and terminates.

Figure 8:
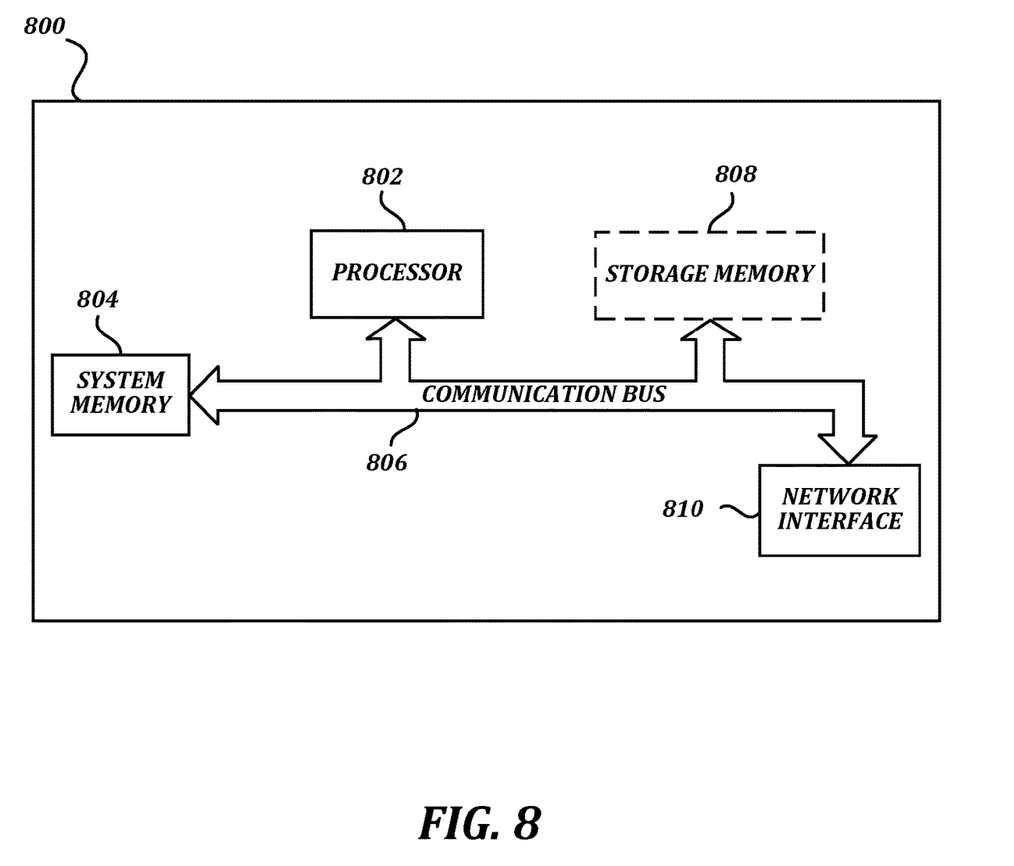
FIG. 8 is a block diagram that illustrates aspects of an exemplary computing device appropriate for use with embodiments of the present disclosure.

FIG. 8 is a block diagram that illustrates aspects of an exemplary computing device appropriate for use with embodiments of the present disclosure. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and nonvolatile and removable and non-removable media implemented in any method or technology capable of storing information, such as computer-readable instructions, data structures, program modules, or other data.

In this regard, the system memory 804 and storage medium 808 depicted in FIG. 8 are merely examples of computer-readable media.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, USB, or other suitable connections protocols using wireless or physical connections. Similarly, the computing device 800 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

While illustrative embodiments have been illustrated and described, it will be appreciated that various changes can be made therein without departing from the spirit and scope of the invention.

The invention claimed is:

1. A computer-implemented method of enabling one or more computing devices of a healthcare information system to retrieve information in response to a query, the method comprising:

generating, by the one or more computing devices, a set of structure tags that mark structures within one or more documents that represent healthcare benefit information;

determining, by the one or more computing devices, a set of semantic tags associated with the one or more documents using the set of structure tags and one or more of string matching, format matching, or page placement matching;

building, by the one or more computing devices, a graph of information using the semantic tags, wherein the graph of information represents information in the one or more documents;

determining, by the one or more computing devices, an intent associated with a query;

matching, by the one or more computing devices, the intent to a template, the template including at least one of a first reference to a first value in the graph of information and a second reference to a second value stored in an account data system; and transmitting, by the one or more computing devices, a response to the query that includes at least one of the first value from the graph of information and the second value stored in the account data system;

wherein building the graph of information in the one or more documents includes identifying a variable within the one or more documents by:

comparing a section of the graph of information in a first document to a section of a second graph of information in a second document, wherein the sections are associated with a matching semantic tag; and detecting a short phrase that is different between the sections within the first document and the second document that is otherwise the same between the sections.

2. The method of claim 1, wherein the one or more documents comprise at least one electronic document that includes at least one of formatted text and images of formatted text.

3. The method of claim 1, wherein generating the set of the structure tags that mark structures within the one or more documents includes:
   detecting a format of text within a section of a first document; and
   generating the structure tag to be applied to the section of the first document that is associated with the detected format.

4. The method of claim 3, wherein the detected format is a font size, a font weight, an indent level, or a page position.

5. The method of claim 3, wherein the structure tag indicates that the tagged section of the first document is a title, a heading, a subheading, a text body, or a table.

6. The method of claim 1, wherein the template further includes a logical rule that compares the second value from the account data system to the first value in the graph of information.

7. A healthcare information system comprising one or more computing devices configured to process queries, by:
   generating, by the healthcare information system, a set of structure tags that mark structures within one or more documents that represent healthcare benefit information;
   determining, by the healthcare information system, a set of semantic tags associated with the one or more documents using the set of structure tags and one or more of string matching, format matching, or page placement matching;
   building, by the healthcare information system, a graph of information using the semantic tags, wherein the graph of information represents information in the one or more documents;
   determining, by the healthcare information system, an intent associated with a query;
   matching, by the healthcare information system, the intent to a template, the template including at least one of a first reference to a first value in the graph of information and a second reference to a second value stored in an account data system; and
   transmitting, by the healthcare information system, a response to the query that includes at least one of the first value from the graph of information and the second value stored in the account data system;
   wherein generating the set of the structure tags that mark structures within the one or more documents includes:
      detecting a format of text within a section of a first document; and
      generating the structure tag to be applied to the section of the first document that is associated with the detected format.

8. The system of claim 7, wherein the one or more documents comprise at least one electronic document that includes at least one of formatted text and images of formatted text.

9. The system of claim 7, wherein building the graph of information in the one or more documents includes identifying a variable within the one or more documents by:
   comparing a section of the graph of information in a first document to a section of a second graph of information in a second document, wherein the sections are associated with a matching semantic tag; and
   detecting a short phrase that is different between the sections within the first document and the second document that is otherwise the same between the sections.

10. The system of claim 7, wherein the detected format is a font size, a font weight, an indent level, or a page position.

11. The system of claim 7, wherein the structure tag indicates that the tagged section of the first document is a title, a heading, a subheading, a text body, or a table.

12. The system of claim 7, wherein the template further includes a logical rule that compares the second value from the account data system to the first value in the graph of information.

13. A non-transitory computer-readable medium having computer-executable instructions stored thereon that, in response to execution by one or more processors by one or more computing devices of a healthcare information system, cause the healthcare information system to respond to queries, by:
   generating, by the healthcare information system, a set of structure tags that mark structures within one or more documents that represent healthcare benefit information;
   determining, by the healthcare information system, a set of semantic tags associated with the one or more documents using the set of structure tags and one or more of string matching, format matching, or page placement matching;
   building, by the healthcare information system, a graph of information using the semantic tags, wherein the graph of information represents information in the one or more documents;
   determining, by the healthcare information system, an intent associated with a query;
   matching, by the healthcare information system, the intent to a template, the template including at least one of a first reference to a first value in the graph of information and a second reference to a second value stored in an account data system; and
   transmitting, by the healthcare information system, a response to the query that includes at least one of the value from the graph of information and the value stored in the account data system;
   wherein building the graph of information in the one or more documents includes identifying a variable within a first document by:
      comparing a section of the graph of information in the first document to a section of a second graph of information in a second document, wherein the sections are associated with a matching semantic tag; and
      detecting a short phrase that is different between the sections within the first document and the second document that is otherwise the same between the sections.

14. The computer-readable medium of claim 13, wherein generating the set of the structure tags that mark structures within the one or more documents includes:
   detecting a format of text within a section of a first document; and
   generating the structure tag to be applied to the section of the first document that is associated with the detected format;
   wherein the detected format is a font size, a font weight, an indent level, or a page position; and wherein the structure tag indicates that the tagged section of the first document is a title, a heading, a subheading, a text body, or a table.

15. The computer-readable medium of claim 14, wherein the detected format is a font size, a font weight, an indent level, or a page position.

16. The computer-readable medium of claim 14, wherein the structure tag indicates that the tagged section of the first document is a title, a heading, a subheading, a text body, or a table.

17. The computer-readable medium of claim 13, wherein the template further includes a logical rule that compares the second value from the account data system to the first value in the graph of information.

* * * * *